(12) United States Patent
Kahmen et al.

(10) Patent No.: US 12,500,730 B2
(45) Date of Patent: Dec. 16, 2025

(54) PHOTONIC PRECISION DELAY COMPONENT FOR HIGH DYNAMIC DELAY RANGE

(71) Applicant: GmbH-Innovations for High Performance Microelectronics/Leibniz-Instit. für innovative Mikroelektronik, Frankfurt (DE)

(72) Inventors: Gerhard Kahmen, Frankfurt (DE); Lars Zimmermann, Frankfurt (DE)

(73) Assignee: IHP GMBH—INNOVATIONS FOR HIGH PERFORMANCE MICROELECTRONICS /LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 301 days.

(21) Appl. No.: 18/463,369

(22) Filed: Sep. 8, 2023

(65) Prior Publication Data

US 2024/0089076 A1 Mar. 14, 2024

(30) Foreign Application Priority Data

Sep. 8, 2022 (EP) .................................... 22194581

(51) Int. Cl.
*H04J 14/08* (2006.01)
*H04B 3/462* (2015.01)
(Continued)

(52) U.S. Cl.
CPC ........... *H04L 7/0075* (2013.01); *H04B 3/462* (2013.01); *H04B 10/508* (2013.01);
(Continued)

(58) Field of Classification Search
CPC .... H04B 10/508; H04B 10/801; H04B 3/462; H04J 14/08; H04Q 11/0005
(Continued)

(56) References Cited

U.S. PATENT DOCUMENTS

| 8,073,333 B2 * | 12/2011 | Bernasconi | ........ H04Q 11/0005 |
| | | | 398/85 |
| 10,530,495 B2 | 1/2020 | Akizawa et al. | |

(Continued)

FOREIGN PATENT DOCUMENTS

EP 2819309 12/2014

OTHER PUBLICATIONS

Melati et al.: "On-chip continuously tunable optical delay line based on cascaded Mach-Zehnder interferometers," Optical Fiber Communications Conference and Exposition (OFC), Mar. 11, 2018, 3 pages (Year: 2018).*

(Continued)

*Primary Examiner* — Li Liu
(74) *Attorney, Agent, or Firm* — Sheridan Ross PC

(57) ABSTRACT

An electronic-photonic integrated precision delay-control component comprises a coarse-delay switching unit that is configured to assume one of a plurality of selectable switching states and to feed, in a given one of the switching states, an optical input signal forward to at least one of a plurality of selectable optical coarse-delay paths. A controllable fine-delay unit is configured to subject the optical input signal to a selectable fine group-delay amount that is tuneable between zero and a maximum fine group-delay amount. The coarse-delay switching unit and the fine-delay unit are arranged in a series connection to control application of a respective total group-delay amount to the optical input signal on any selectable total delay path, the total group-delay amount corresponding to a sum of the respective
(Continued)

coarse group-delay amount and of the selectable fine group-delay amount. Co-integration of electronic components allows a complete pulse train generation on one chip with low sensitivity to perturbation, low drift and low manufacturing costs. A desired delay of individual pulses of the optical input signal can be tuned on chip with particularly high precision at particularly high pulse repetition frequencies.

15 Claims, 7 Drawing Sheets

(51) Int. Cl.
| | |
|---|---|
| *H04B 10/508* | (2013.01) |
| *H04B 10/80* | (2013.01) |
| *H04L 7/00* | (2006.01) |
| *H04Q 11/00* | (2006.01) |

(52) U.S. Cl.
CPC ............ *H04B 10/801* (2013.01); *H04J 14/08* (2013.01); *H04Q 11/0005* (2013.01); *H04Q 2011/0045* (2013.01); *H04Q 2011/0052* (2013.01); *H04Q 2213/11* (2013.01); *H04Q 2213/1336* (2013.01); *H04Q 2213/214* (2013.01); *H04Q 2213/217* (2013.01)

(58) Field of Classification Search
CPC ... H04Q 2011/0045; H04Q 2011/0052; H04Q 2213/11; H04Q 2213/1336; H04Q 2213/214; H04Q 2213/217; H04L 7/0075
USPC .............................. 398/45, 53, 201, 212, 214
See application file for complete search history.

(56) References Cited

U.S. PATENT DOCUMENTS

| | | | | |
|---|---|---|---|---|
| 2003/0007231 | A1* | 1/2003 | Winzer .................. | G02F 1/225 |
| | | | | 359/279 |
| 2003/0048141 | A1 | 3/2003 | Suda | |
| 2003/0099321 | A1* | 5/2003 | Juan ......................... | H03L 7/16 |
| | | | | 375/376 |
| 2005/0058398 | A1 | 3/2005 | Doerr | |
| 2015/0003833 | A1* | 1/2015 | Kahmen ............. | H03M 1/1066 |
| | | | | 398/115 |
| 2018/0017672 | A1* | 1/2018 | Warke .................. | G01S 7/4052 |
| 2020/0204244 | A1* | 6/2020 | Hajimiri ............. | H04B 7/0697 |

OTHER PUBLICATIONS

Chen et al., "Compact and Broadband Variable True-Time Delay Line with DLL-Based Delay-Time Control," Circuits Systems and Signal Processing, vol. 37, No. 3, Jul. 11, 2017, pp. 1007-1027.

Fikes et al., "Programmable Active Mirror: A Scalable Decentralized Router," IEEE Transactions on Microwave Theory and Techniques, vol. 69, No. 3, Mar. 2021, pp. 1860-1874.

Ibrahim et al., "Wideband MEMS Switched Delay Lines with High Phase Linearity," 21st IEEE International Conference on Electronics, Circuits and Systems (ICECS), Dec. 7, 2014, pp. 187-190.

Idres et al., "Optical Binary Switched Delay Line based on Low Loss Multimode Waveguide," Optical Fiber Communications Conference and Exhibition (OFC), Mar. 6, 2022, 3 pages.

Krüger et al., "A Monolithically Integrated Opto-Electronic Clock Converter in Photonic SiGe-BiCMOS Technology," IEEE Bipolar/BiCMOS Circuits and Technology Meeting—BCTM, Oct. 26-28, 2015, pp. 129-132.

Krüger et al., "A Monolithically Integrated, Optically Clocked 10 GS/s Sampler with a Bandwidth of >30 GHz and a Jitter of <30 fs in Photonic SiGe BiCMOS Technology," IEEE Custom Integrated Circuits Conference (CICC), Apr. 30, 2017, 4 pages.

Krüger, "Monolithic Opto-Electronic Co-Integration on the Example of a Photonic-Assisted, High-End Sampler," Thesis Submitted to Institut für Halbleitertechnik der Universität Stuttgart, 2018, 157 pages.

Lee et al., "Calibration of wideband arrays using photonic delay lines," Electronics Letters, vol. 31, No. 18, Aug. 31, 1995, pp. 1533-1534.

Melati et al., "On-chip continuously tunable optical delay line based on cascaded Mach-Zehnder interferometers," Optical Fiber Communications Conference and Exposition (OFC), Mar. 11, 2018, 3 pages.

Sander et al., "10 GHz femtosecond pulse interleaver in planar waveguide technology," Optics Express, vol. 20, No. 4, Feb. 13, 2012, 12 pages.

Weiner et al., "Ultrafast optical pulse shaping: A Tutorial review," Optics Communications, vol. 284, 2011, pp. 2669-3692.

Extended European Search Report for Europe Patent Application No. 22194581.9, dated Feb. 17, 2023, 15 pages.

* cited by examiner

PHOTONIC PRECISION DELAY COMPONENT FOR HIGH DYNAMIC DELAY RANGE

CROSS-REFERENCE TO RELATED APPLICATION

This application claims the benefit of European Patent Application No. 22194581.9 filed Sep. 8, 2022, the entire contents of which are incorporated herein by reference in its entirety.

TECHNICAL FIELD

The present invention relates to an electronic-photonic integrated precision delay-control component. It also relates to an optical precision delay component and to a laser arrangement.

BACKGROUND

Today's wideband applications in the multi-GHz and multi-GS/s regime such as high-frequency measurement, wireless communications, or radar applications in the digital domain impose particular performance requirements on application hardware devices. Examples of application devices subject to such requirements include analog-to-digital converters (ADC) for high-resolution sampling of analog signals, and frequency metrology devices.

In particular, time-interleaved ADC architectures make use of multiple ADC blocks to sample the same input waveform, but at different relative phases. The different samples generated by the ADC blocks are interleaved to create a waveform as if only one ADC was sampling the waveform at a high sampling rate. Since multiple ADC blocks are used in such time-interleaved ADCs, an error in the phase offset between individual ADC blocks can deteriorate the performance of the ADC, e.g. by creating non-linearities and harmonic products. Timing uncertainty in the sampling process can be associated with clock jitter because jitter in the clock signal leads to a deviation from an ideal sampling instant. As a consequence of this timing uncertainty, the clock jitter can introduce an error in a sampled digital output signal that is provided by an analog-to-digital converter (ADC), and not only in time-interleaved ADCs. Digital-to analog converters are subject to equivalent performance issues.

For achieving a high time resolution in the sampling of high-frequency signals, the accuracy of the sampling instant is thus a key factor. Jitter in fact has been considered a limiting factor in the performance of ADCs for high-frequency signals. A clock signal timing that can be precisely controlled to within a few femtoseconds is necessary to achieve the required performance of such application devices.

Photonic-assisted sampling is a known approach to improve the jitter-related performance of an ADC and other clock sensitive RF components. This technique uses a conversion of an optical clock signal in the form of a pulse train, which may for instance be provided by a mode-locked laser (MLL), into an electrical clock signal.

Electronic-photonic delay components are used in such devices to generate the pulse train with the required repetition rate. Electronic-photonic delay components thus play an important role in this and many other demanding high-frequency application fields of photonic-assisted electronic devices.

SUMMARY

The present invention recognizes and resolves challenges met in achieving a particularly high timing precision in photonic-assisted electronic devices.

According to a first aspect of the present invention, an electronic-photonic integrated precision delay-control component is provided. This precision delay-control component comprises:
 an optical input interface for receiving and internally forwarding a pulsed optical input signal;
 a coarse-delay switching unit that is configured to assume one of a plurality of selectable switching states and to feed, in a given one of the switching states, the optical input signal forward to at least one of a plurality of selectable optical coarse-delay paths, to subject the optical input signal to one or more respective coarse group-delay amounts from a plurality of discrete coarse group-delay amounts that includes a group-delay amount of zero, wherein the coarse-delay switching unit receives an electronic coarse-delay switching signal indicative of the one or more respective coarse group-delay amounts to be selected in the given switching state;
 a controllable fine-delay unit that is configured to subject the optical input signal to a selectable fine group-delay amount that is tuneable between zero and a maximum fine group-delay amount which amounts to a smallest of the coarse group-delay amounts, wherein the optical fine-delay unit receives an electronic fine-delay-selection signal, which is indicative of a selected fine group-delay amount to be tuned to; and wherein
 the coarse-delay switching unit and the fine-delay unit are arranged in a series connection to control application of a respective total group-delay amount to the optical input signal on any selectable total delay path including the coarse-delay switching unit and the fine-delay unit, the respective total group-delay amount corresponding to a sum of the respective coarse group-delay amount and of the selectable fine group-delay amount that are selectable via the coarse-delay switching signal and the fine-delay-selection signal, respectively.

The electronic-photonic integrated precision delay (EPIPD) control component of the present invention is based on the observation of inaccuracies in the timing of optical clock signals. The inventors have recognized that component tolerances and spatially variant thermal loads contribute to such inaccuracies. Converting the optical clock signal into an electrical clock signal supplied to the electronic components of the ADC involves a propagation of the optical clock signal through an optical transmission line from the laser to the photonic conversion element. Component tolerances and spatially variant thermal loads let the propagation time across a given transmission line differ from a desired value determined in the design phase. In the case of a time-interleaved ADC architecture, such inaccuracies may affect different ADC blocks in different, varying degrees because the optical clock signals may be fed to the respective photodetectors via spatially separated transmission lines associated with the individual ADC blocks as separate end points. Such inaccuracies are not predictable in the design phase of an application device comprising the ADC, and may change over time.

Based on these observations and recognitions, the present invention proposes the above EPIPD control component, which is a monolithically integrated control component configured for receiving and internally forwarding a pulsed optical input signal with a controlled delay of particular precision. The EPIPD control component has a coarse-delay switching unit for feeding the optical input signal forward to one of a plurality of selectable optical coarse-delay paths. In addition to such coarse-delay switching, the EPIPD control component features an integrated tuneable fine group delay unit. This integrated optical fine-delay unit receives an electronic fine-delay-selection signal, which is indicative of a selected fine group-delay amount to be tuned to. The integrated tuneable fine group delay unit is configured to subject the optical input signal to a selectable fine group-delay amount that is tuneable between zero and a maximum fine group-delay amount, as indicated by the electronic fine-delay-selection signal. The maximum fine group-delay amount suitably amounts to a smallest of the coarse group-delay amounts. However, the maximum fine group-delay amount may differ from that value according to the requirements of a particular application case. In any case, the value is suitably selected somewhat larger than the smallest of the coarse group-delay amounts in order to allow accounting for potential tolerances in the fine tuning.

In the EPIPD control component, the coarse-delay switching unit and the fine-delay unit are arranged in a series connection. This achieves a precision control of the application of any respective total group-delay amount to the optical input signal on any selectable total delay path including the coarse-delay switching unit and the fine-delay unit. The respective total group-delay amount corresponds to a sum of the respective coarse group-delay amount and of the selectable fine group-delay amount that are selectable via the coarse-delay switching signal and the fine-delay-selection signal, respectively.

This way, any desired delay of the optical input signal can be tuned on chip with particularly high precision. Depending on the given application case this allows setting or, as will be explained in the context of embodiments described further below, even dynamically adapting the total group-delay amount that is to be imposed on a given optical input signal (or time section of it).

The electronic-photonic precision delay-control component of the present invention is an integrated component, in particular an electronic-photonic integrated circuit (EPIC) chip. This means that the component is monolithically integrated in a chip that can typically be fabricated using a per-se known process technology such as a photonic CMOS or BiCMOS process. Other processes that are suited to provide a monolithic co-integration of high-speed photonic devices and electronic devices can equally be used. Since electronic components are co-integrated, everything, typically with the exception of the coarse delay lines, can be created monolithically and a complete pulse train generation can be built on one chip. Other advantages of the monolithic solution include its insensitivity, e.g. to microphonics, lower manufacturing costs. The electronic-photonic precision delay-control component can thus be fabricated with high accuracy using only a very small chip area despite the complexity of its optical functionality. Furthermore, a particularly accurate calibratability is achieved, since under thermal aspects everything is on one common chip, with less drift. The design choice of an integrated component also combines well with the use of a mode-locked laser in keeping jitter or distortion in the distribution of an optical clock signal particularly low.

In the following, embodiments of the electronic-photonic integrated precision delay-control component will be described.

In some embodiments, some or all of the optical coarse-delay paths are provided externally to the EPIPD control component, i.e., are not part of the EPIPD control component. In these embodiments the EPIPD control component is a stand-alone component, in particular an EPIC chip, with a suitable optical interface for connection to a photonic delay module, which may for instance be implemented on an optical printed circuit board (OPCB).

Thus, the present invention also proposes an optical precision delay component that comprises
    an electronic-photonic integrated precision delay-control component according to one of the embodiments disclosed herein; and
    a photonic delay module that is connected to the coarse-delay switching unit and comprises a plurality of optical delay lines arranged to receive the optical input signal from the coarse-delay switching unit, wherein each of the optical delay lines is configured to subject the optical input signal to one of the plurality of discrete coarse group-delay amounts.

The EPIPD control component feeds, in a given one of the switching states, the optical input signal forward to a selectable one of a plurality of output ports of the EPIPD control component that is connectable with the at least one of a plurality of selectable external optical coarse-delay paths in the photonic delay module, to subject the optical input signal to one or more respective coarse group-delay amounts. In such embodiments, an EPIPD control component and an external photonic delay module are suitably co-designed for operation in connection with each other, in that the maximum fine group-delay amount on the EPIPD control component is adapted to match the smallest of the coarse group-delay amounts on the photonic delay module.

However, in other embodiments, the EPIPD control component is configured for use with different photonic delay modules having different values of the smallest coarse group-delay amount. Given a sufficiently large fabrication-based upper limit of maximum fine group-delay amount of the EPIPD control component, the desired maximum fine group-delay amount for a given application case may be selectable by suitable control setting. Such control setting may limit the generation of the electronic fine-delay-selection signal with a maximum fine group-delay amount that is adapted to the given individual EPIPD control component product.

In other embodiments, the coarse-delay paths, in particular a photonic delay module as described, are integrated with the EPIPD control component on chip. This is particularly advantageous for smaller coarse delay values and saves the hardware complexity and optical loss potential involved in an interface between an EPIC chip comprising the control component and an OPCB comprising the external photonic delay module.

In preferred embodiments, the coarse-delay switching unit comprises a plurality of electronically controllable optical switches for controllably feeding the optical input signal forward to the at least one selectable optical coarse-delay path, to thus subject the optical input signal to the one or more respective discrete coarse group-delay amounts. Here, the coarse-delay switching signal is indicative of the switching states of the individual optical switches to be selected for setting the selected one or more optical coarse-delay paths. In some application cases, the selection of coarse-delay paths includes two or more coarse delay paths in parallel, which may also include a zero-delay path. This is for instance advantageous for generating one or more interleaved pulses based on given input pulses, for thus increasing a pulse frequency of the incoming pulsed optical input signal.

In some embodiments of this group of embodiments, the coarse-delay switching unit comprises a series connection of two or more of the optical switches, which are inserted between a series of zero-delay sections of a zero-delay path that is associated with the group-delay amount of zero. The optical switches preferably have a first switch input port for receiving the optical input signal from the zero-delay path as a first switch input signal, a zero-delay output port for feeding the first switch input signal to the next-succeeding zero-delay section, and a discrete-delay output port for feeding the first switch input signal forward to an associated one of the coarse-delay paths.

In some further embodiments of this group of embodiments that may advantageously be combined with those described in the preceding paragraph, those optical switches that are not the first optical switch along the zero-delay path have an additional second switch input port for additionally receiving a respective delayed optical input signal from an optical coarse-delay path associated with a respective next-preceding one of the optical switches in the series connection as a second switch input signal, and are configured to subject the second switch input signal to switching action to be performed by the respective optical switch independently from the switching action to be performed for the first switch input signal. These embodiments substantially increase the number of available coarse-delay-amount options.

The provision of the optical switches provides control options for selecting one from a set of different alternative propagation paths of a light pulse. The options for selection comprise guiding the optical input signal with zero delay through the coarse-delay switching unit, or branching off the optical input signal for imposing a given coarse-delay amount.

In other embodiments, the optical switches are configured to enable both mentioned switching options in parallel, that is, guiding a pulse along a zero delay path and feeding it towards a selectable coarse-delay path. In these variants of the electronic-photonic integrated precision delay-control component, the optical switches are configured to be individually switched to one of
 a first switching state to only feed the respective first or second switch input signal forward to a next zero-delay section,
 a second switching state to only feed the respective first or second switch input signal forward to a respective one of the optical coarse-delay paths that branches off from the zero-delay path to subject the respective first or second switch input signal to an associated one of the discrete coarse group-delay amounts, and
 a third switching state to feed the respective first or second switch input signal forward to the zero-delay path and to the respective one of the optical coarse-delay paths in parallel.

In this embodiment, the coarse-delay switching signal is preferably indicative of the respective selected switching state of the respective optical switches to be applied to the first or second switch input signal.

In comparison with the embodiment that provides alternative switching options and which was described in the preceding section, the provision of a different type of optical switches in the present embodiment increases the number of control options for selecting one or more propagation paths of an individual light pulse or of a pulse train. The options for selection comprise guiding the optical input signal with zero delay through the coarse-delay switching unit, or branching off the optical input signal for imposing a given coarse-delay amount, or both, guiding the optical input signal with zero delay through the coarse-delay switching unit and branching off the optical input signal for imposing a given coarse-delay amount. The optical switches of this embodiment preferably comprise a monolithically integrated, electrically controllable beam splitter that is arranged and configured in response to receiving a coarse-delay switching signal indicating one of the three mentioned switching states, to direct incoming light along the selected propagation path or paths. Such an electrically controllable or configurable splitter can be built from basic silicon photonic devices, typically comprising cross-linked couplers (2×2, or N×N in general).

For further increasing the precision of propagation time along a selected propagation path, the coarse-delay switching unit preferably further comprises a controllable delay-calibration device, which is arranged between at least one of the optical switches and an associated optical coarse-delay path. The controllable delay-calibration device receives a calibration-control signal indicative of the tuneable calibration-delay amount, and is configured to generate a calibration delay of the tuneable calibration delay amount indicated by the calibration-control signal. Thus, while the fine-delay unit is connected in series with the coarse-switching unit and provides a controllable fine group delay correction that affects the group delay on every optical path through the coarse-delay switching unit, the delay calibration device is integrated into the coarse-delay switching unit and associated with only one optical switch. Used in combination with the fine-delay unit, it thus allows an even more precise control in fine-tuning the individual propagation path controlled by the optical switch associated with a given coarse group-delay amount. In preferred embodiments, there are multiple controllable delay calibration devices, each associated with one of the optical switches. The tuneable calibration delay amount can be set using for instance a Kerr cell or a Pockel's cell, or employing a thermal control of the refractive index and thus the group delay of a delay element. The range of fine-tuning delay somewhat depends on the technology used, more specifically optical losses. A practically suitable tuneable calibration delay amount is between a few ps and a few 100 ps.

Controllable delay-calibration devices of this kind can be used in different positions of the EPIPD control component, in particular in the input of the fine delay unit and in calibration stages of the coarse delay switching unit.

In a variant of this embodiment, an additional controllable delay-calibration device is arranged upstream or downstream from the fine-delay unit.

For making optimal use of the delay calibration device, an implementation of these embodiments further comprises a calibration control loop with
 a delay-monitoring detector that is arranged and configured to receive a fraction of the optical input signal between the optical switch and its associated optical coarse-delay path or a fraction of an optical output signal behind a last of the optical switches and to generate an electrical delay-monitoring signal representing a temporal intensity trace of a pulse train in the detected optical input signal;
 a spectrum-analysis unit that receives the electrical delay-monitoring signal that and is configured to determine frequency components governing the generated temporal intensity trace of the electrical delay-monitoring signal and to provide frequency-analysis information indicative thereof;

a feedback driver that is configured to generate and provide to the delay-calibration device respective calibration control signals indicative of an increase or decrease of the calibration delay to be effected; and a feedback controller that is configured to control the feedback driver in generating the calibration control signals to maintain a desired temporal dependence of the optical input signal as a pulse train that is governed by a single pulse repetition frequency.

In the signal processing involved in the evaluation of the frequency components of the detected pulse train, toggle flip-flops can be used to generate the electrical delay-monitoring signal with a duty cycle that is suitable for further processing, since the light pulses of the received pulse train are typically in the picosecond or even femtosecond domain. However, if the used photodetectors in the delay-monitoring detector are fast enough and capable of generating an output current of sufficient amount, the use of toggle flip-flops is not necessary.

The controllable fine-delay unit comprises an optical conductor that conducts the incoming optical input signal with a group-delay amount that depends on a current value of a delay-control quantity associated with the optical conductor. In these embodiments of the electronic-photonic integrated precision delay-control component, the optical conductor is preferably configured to subject an incoming optical signal to a fine group-delay amount that depends on an electrically controllable physical quantity indicative of a state or a physical or material characteristic of the conductor. A controllable delay actuator receives the fine-delay-selection signal and is arranged and configured to set the delay-control quantity in dependence on fine-delay-selection signal.

The optical conductor of the fine-delay unit in such embodiments forms a delay line. To realize an optical delay, light group velocity can for instance be slowed down in an optical waveguide structure, such as in a Bragg grating, a resonator, or a photonic crystal waveguide. In some embodiments, the delay line thus is a resonant optical delay line. A tunable group delay can be achieved by shifting a resonance wavelength.

In other embodiments, the delay line is a non-resonant optical delay line. In some of these embodiments, the optical conductor comprises one or more modulators, in particular Mach-Zehnder modulators. Integrated and continuously electrically tuneable optical delay lines based on a single Mach-Zehnder interferometer or based on two or more cascaded Mach-Zehnder interferometers are per se known. Melati et al., in "On-chip continuously tunable optical delay line based on cascaded Mach-Zehnder interferometers", published online under https://re.public.polimi.it/retrieve/handle/11311/1121632/468637/melati_delay_line_ofc_2018.pdf, describe a tunable delay line made of 2×2 couplers. The authors of this publication explain that the tunability of non-resonant delay lines compared to resonant delay lines is smaller, whereas their bandwidth is larger and a finer control of the tuning can be achieved.

In one exemplary implementation, a physical quantity used for controlling the fine group-delay amount is a temperature of the conductor material. The fine-delay unit of this exemplary implementation comprises a controllable heating element configured to set the temperature of the conductor material in dependence on the fine-delay selection signal. The conductor material of this embodiment induces a fine group-delay amount based on a known dependence on the controlled temperature of the conductor material.

In order to achieve and maintain a stable phase in the output of the fine-delay unit, one embodiment further comprises a phase-stabilization loop with a phase discriminator arranged and configured to receive a tapped fraction of a signal tapped anywhere along an internal signal propagation path, for instance a tapped fraction of a fine-delay-output signal at an output of the fine-delay unit, and to receive an optical reference signal corresponding to the optical input signal, and to provide a phase-discriminator output signal indicative of a phase difference between the respective tapped signal (e.g., the tapped fine-delay output signal) and the reference signal; and a phase-control unit that receives the phase-discriminator output signal and is configured to store an initial phase difference between the tapped signal and the reference signal and to adapt the fine-delay-selection signal over time to maintain the initial phase difference between the tapped signal and the reference signal.

This way, the relative phase of different spectral components of the individual pulses of the high-frequency periodic pulse train can be stabilized against a drift of the phase due to dispersive effects of the active and passive optical components along the propagation path.

In other embodiments, additional phase-stabilization loops are used to stabilize the phase at the output of the delay-calibration devices. A corresponding phase-stabilization loop for a delay-calibration device thus comprises a phase discriminator arranged and configured to receive a fraction of a delay-calibration output signal at an output of the delay-calibration device and to receive an optical reference signal corresponding to the optical input signal, and to provide a phase-discriminator output signal indicative of a phase difference between the respective delay-calibration output signal and the reference signal. A phase-control unit receives the phase-discriminator output signal and is configured to store an initial phase difference between the respective delay-calibration output signal and the reference signal and to adapt the calibration-control signal over time to maintain the initial phase difference between the respective delay-calibration output signal and the reference signal.

Other embodiments have only phase-stabilization loops that stabilize the phase at the output of the delay-calibration devices. The provision and placement of phase-stabilization loops can thus be determined in the design phase of the precision delay component in accordance with the requirements of a particular application case and based on the characteristics of the hardware components to be used.

As mentioned before, in preferred application cases, the optical precision delay-control component is a part of an optical precision delay component that comprises the electronic-photonic integrated precision delay-control component according to one of the embodiments described herein and a delay module that is connected to the coarse-delay switching unit. The delay module comprises a plurality of optical delay lines arranged to receive the optical input signal from the coarse-delay switching unit, and each of the optical delay lines is configured to subject the optical input signal to one of the plurality of discrete coarse group-delay amounts.

The delay module may be an optical or electro-optical printed circuit board, where the optical delay lines are respective monolithically integrated waveguides. In other embodiments, the delay lines are respective optical fibers connected to the coarse-delay switching unit.

Different configurations of delay lines can be used in accordance with different application cases. In some embodiments, the optical precision delay component implements discrete coarse group-delay amounts $T_{D,n}$, n=0, 1, 2, 3, ..., N, form a set of increasing multiples of an elementary coarse group-delay amount $T_0$, in accordance with a linear sequence governed by $T_{D,n}=n \times T_0$, up to a maximum multiple $N \times T_0$, or in accordance with a binary sequence governed by $T_{D,0}=0$ for n=0 and $T_{D,n}=2^n \times T_0$, n=, 1, 2, 3, ..., N up to a maximum multiple $2^N \times T_0$.

It is particularly advantageous to provide the control components in the precision delay component itself, which to this end further comprises an electronic switching-control circuit that is configured to receive a delay control input indicative of a total group-delay amount the optical input signal is to be subjected to, and to generate and provide the coarse-delay switching signal and the fine-delay-selection signal using the delay control input.

Among the applications profiting from the precision delay component is a pulse interleaver comprising an optical precision delay component according to any of the embodiments described herein, arranged to receive a pulse-shaped optical input signal and configured to subject the optical input signal to a plurality of equidistant total group-delay amounts to provide an optical output signal having an output pulse period forming an integer multiple of the basic pulse period. The pulse interleaver is a very precisely controllable system in that the temporal position of the individual pulses in relation to each other can be controlled very precisely and, above all, is allows readjusting them. With this readjustment, a very pure signal without significant "interleaving spurs" can be generated. Another advantage is that, for example, when using fast modulators, microphonic effects can be reeled out. Slow effects, such as thermals and aging, can also be controlled by making use of heating elements for fine tuning, as described above in the context of embodiments.

A related application embodiment is a laser arrangement that comprises a mode-locked laser source configured to generate and provide a pulse train as the periodic pulse-shaped optical input signal; and the described pulse interleaver. The pulse interleaver can achieve an output pulse train with an up-converted repetition rate in comparison with the pulse train provided by the mode-locked laser alone.

A further application embodiment of the present invention is an ADC comprising the described pulse interleaver or the disclosed laser arrangement, in particular an ADC with a time-interleaved architecture having multiple ADC blocks for sampling an input waveform at different relative phases. Due to the use of the pulse interleaver with the precision delay component as disclosed herein for providing the clock signal, clock jitter and the resulting error in the phase offset between individual ADC blocks are minimized and a high resolution with regard to the effective number of bits in the sampling of high-frequency signals is achieved. The system is very precisely controllable, by adjusting the temporal position of the individual pulses to each other very precisely and, above all, readjusting it dynamically in the course of operation. With this readjustment, one can generate a very pure clock signal which result in low interleaving spurs. Another advantage is that, for example, when using fast modulators, microphonic perturbation effects can be eliminated. Slow effects, such as thermals and aging, can also be regulated out using heating elements.

Use of a laser of this kind for providing an optical clock signal substantially improves the performance of an ADC in sampling high-frequency signals in the multi-GHz and multi-GS/s regime.

BRIEF DESCRIPTION OF THE DRAWINGS

In the following, further embodiments will be described with reference to the enclosed drawings. In the drawings.

DETAILED DESCRIPTION

Before turning to the description of the drawings, it is noted that throughout the drawings optical signaling paths, as implemented by e.g. optical waveguides between the optical components, are drawn as full lines. Arrows along the full lines indicate the direction of optical signal propagation. In contrast, electrical signaling paths, as implemented e.g. by metallic interconnect lines, are drawn as dashed lines for better distinction from the optical signaling paths.

Figure 1:
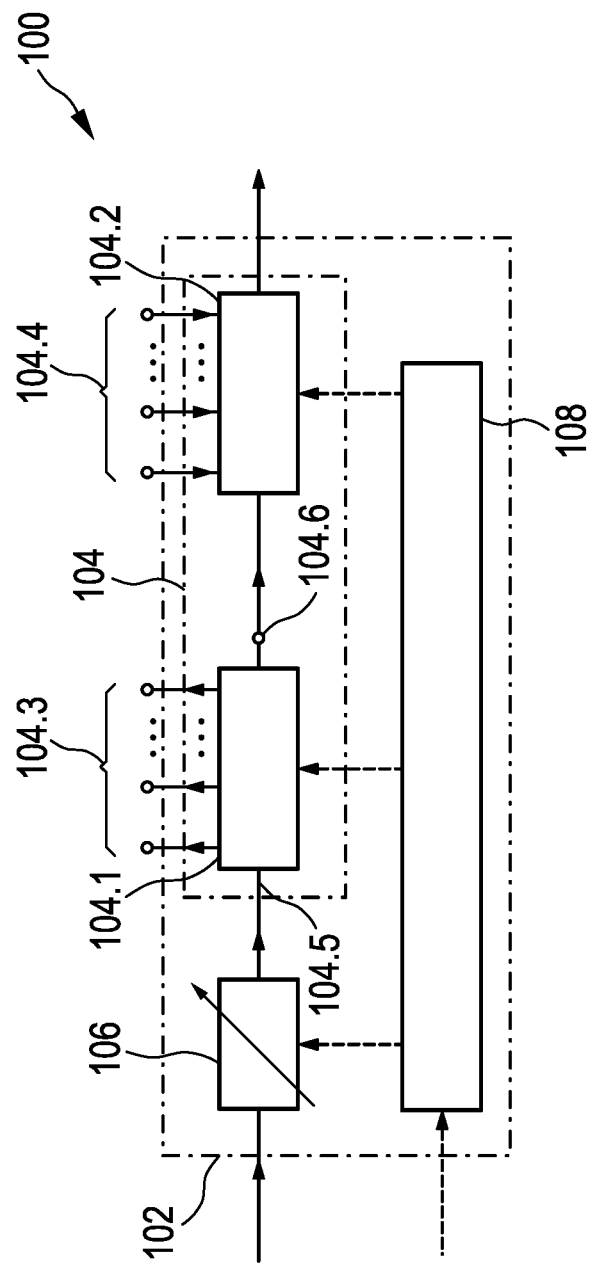
FIG. 1 shows an embodiment of an electronic-photonic integrated precision delay (EPIPD)-control component.

FIG. 1 shows an exemplary embodiment of an electronic-photonic integrated precision delay (EPIPD)-control component 100.

The EPIPD control component 100 is implemented as an electronic-photonic integrated circuit (EPIC) and suited for controlling the propagation of individual light pulses or of a light pulse train received at an input interface 102 along a desired optical path. The EPIPD control component 100 serves for achieving a very precisely controllable delay that can be controlled to within a few femtoseconds.

The EPIPD control component 100 comprises a coarse-delay switching unit 104 and a fine-delay unit 106. Furthermore, an integrated controller circuit 108 is provided for driving operation of the coarse-delay switching unit 104 and of the fine-delay unit 106. For receiving control information to be used in controlling the units 104 and 106, the integrated controller circuit 108 may have a control input. Some variants described further below have integrated sensors for generating internal feedback signals that are delivered back to the controller circuit 108 as an input in addition or as an alternative to external control information.

The coarse-delay switching unit 104 is controllable by the controller circuit 108 to assume one of a plurality of selectable switching states and to feed, in a given one of the switching states, the optical input signal forward to at least one of a plurality of selectable optical coarse-delay path outputs. A plurality of electronically controllable optical switches controllably feed the optical input signal forward to one or more of the selectable optical coarse-delay paths, to thus subject the optical input signal to the one or more respective discrete coarse group-delay amounts. In the present embodiment, the coarse-delay switching unit 104 comprises a first switch component 104.1 that is associated with a delay output port 104.3 and a second switch component 104.2 that is associated with a delay input port 104.4, which is arranged downstream from the delay output port 104.3 and serves for receiving delayed optical input signals that are output from the delay output port 104.3 to one or more selected optical coarse-delay components.

Notably, the EPIPD component 100 does not comprise such optical coarse-delay components such as optical delay lines. Thus, the desired coarse delay amount is applied by coarse-delay components that are external to the EPIPD component 100 and that for this reason are not shown in FIG. 1. The delay output port 104.3 and the delay input port 104.4 are configured to be connected to such coarse-delay components. As will be described later, coarse-delay components can for instance be connected to the EPIPD component 100 on an electro-optical circuit board. The delay output port 104.3 has a plurality of parallel individual delay outputs for guiding light pulses to one or more selected external coarse-delay components for effecting a coarse group-delay amount by propagation via the respective coarse delay component. Similarly the delay input port 104.4 of the second switch component 104.2 has a plurality of parallel individual delay inputs for receiving the delayed light pulses from one or more selected coarse-delay components. Each delay input at the second switch component 104.2 is associated with exactly one delay output at the first switch component 104.1 in a 1:1 association, and a coarse-delay component of a predetermined coarse-delay amount is to be used for connecting a given pair of associated delay output and delay input.

The coarse-delay switching unit 104 further has an input 104.5 for receiving the light pulse light pulse train, and a zero-delay output 104.6 for controllably forwarding the received light pulse or light pulse train to the second switch component 104.2 without any delay (beyond that of normal light propagation).

The controller circuit 108 is configured to perform switching control for controlling the application of a group delay to selected received light pulses or a light pulse train via suitable switching operation of the first and second switch components 104.1 and 104.2, respectively. Depending on the switching state assumed, the first and second switch components 104.1 and 104.2 open or close respective light propagation paths via one or more delay outputs of the first switch component 104.1 and associated optical delay inputs 104.2 of the second switch component 104.2, in order to apply one or more respective coarse group-delay amounts that are selectable from a plurality of discrete coarse group-delay amounts. A group-delay amount of zero is included and can be effected by simply forwarding the received light pulses via zero-delay output 104.6. The coarse-delay switching unit 104 receives corresponding electronic coarse-delay switching signals from the controller circuit 108. The coarse-delay switching signals control the switching states to be assumed by the first and second switch components 104.1 and 104.2 and which are thus indicative of the one or more respective coarse group-delay amounts to be effected in the given switching state of the coarse-delay switching unit 104.

Regarding the implementation of the first and second switching units, use can be made of a variety of known physical switching mechanisms and semiconductor technology platforms based on Si or InP or MN. Monolithic integration can be achieved for instance using SiGeSn alloy heterostructures on Si or SOI or GeOI, or alloy heterostructures from InGaAsP or InAlAsP based on InP, or wurtzite AlGaN alloy heterostructures based upon MN or sapphire or Si. Among the switching mechanisms, electro-optical or thermo-optical techniques can be used, inter alia. Regarding performance, a high switching speed, i.e., a short time of transition from one switch state to the other, is strongly desired, and low optical insertion loss (IL).

While FIG. 1 shows the first and second switching units as a single block, this graphical representation is not to be understood as a limitation in terms of hardware implementation options. For example, each of the switch components 104.1 and 104.2 can be split into one or more optical switches, wherein each optical switch serves for controllably opening or closing a single delay output or delay input, respectively.

In addition to the coarse-delay switching unit 104, the EPIPD component 100 comprises the controllable fine-delay unit 106. The coarse-delay switching unit 104 and the fine-delay unit 106 are arranged in a series connection to control application of a respective total group-delay amount to the optical input signal on any selectable total delay path including the coarse-delay switching unit and the fine-delay unit. The respective total group-delay amount corresponds to a sum of the respective coarse group-delay amount and of the selectable fine group-delay amount that are selectable via the coarse-delay switching signal and the fine-delay-selection signal, respectively. In FIG. 1, the series connection is formed by the coarse-delay switching unit 104 following the fine-delay unit 106 in the direction of light propagation. However, this order may be reversed in other embodiments, in which the coarse-delay switching unit 104 precedes the fine-delay unit 106 in the direction of light propagation. In the latter case, the fine-delay unit is thus arranged downstream from the second switching component 104.2.

The maximum fine group-delay amount that is achievable by the fine-delay unit 106 is a design choice that can be made with a view to the given application case. In advantageous embodiments, the maximum fine group-delay amount amounts to a smallest of the coarse group-delay amounts with some overlap to compensate group delay spread, e.g. caused by manufacturing tolerances. This way, a broad range of fine group-delay amounts without delay-gaps is available for fine tuning to adapt and complement the coarse group-delay that is controlled by the coarse-delay switching unit. Suitably, the tuning capability covers a continuous range of fine group delays. The optical fine-delay unit 106 receives an electronic fine-delay-selection signal, which is indicative of a selected fine group-delay amount to be tuned to.

The fine-delay unit 106 subjects the received optical input signal to a selectable fine group-delay amount that is tuneable between zero and a maximum fine group-delay amount by control action performed by the controller circuit 108. With regard to implementations, it may comprise an optical conductor that conducts the incoming optical input signal with a group-delay amount that depends on a current value of a delay-control quantity associated with the optical conductor. The optical conductor may comprise a tunable optical waveguide structure such as a Bragg grating, a resonator, or a photonic crystal waveguide. In other embodiments, the optical conductor includes two or more cascaded Mach-Zehnder interferometers. In addition, the group delay may be controlled using a Kerr cell or a thermally controlled variable group delay component.

It is noted that in a variant, instead of providing the electronic controller circuit 108 in integrated form together with the coarse-delay switching unit 104 and with the fine-delay unit 106 on the same electronic photonic integrated circuit (EPIC) chip, the controller circuit 108 may be arranged on a separate chip, which in turn may be connected to a photonic integrated circuit (PIC) chip, for instance in a vertical arrangement via copper pillar bumps, Al—Al wafer bonding of through silicon vias (TSV) in a common package.

The EPIPD control component thus is a monolithically integrated control component for receiving and internally forwarding a pulsed optical input signal with a controlled delay of particular precision. The series connection of the coarse-delay switching unit and the fine-delay unit allows achieving a precision control of the application of any respective total group-delay amount to the optical input.

Figure 2:
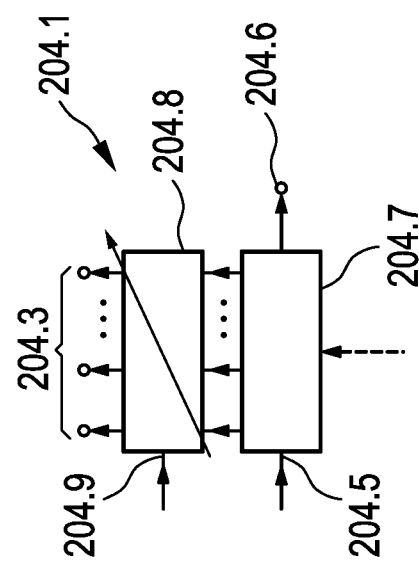
FIG. 2 shows a variant of an optical switching component suited for use in the EPIPD-control component of FIG. 1.

FIG. 2 shows a variant of an optical switching component 204.1 suited for use in the EPIPD-control component of FIG. 1. The optical switching component 204 is suited as an alternative to the first switching component 104.1 of the EPIPD control component 100.

The optical switching component 204.1 generally resembles the optical switching component 104.1, but additionally comprises a controllable delay-calibration device 204.8 which is arranged at the output of the optical switching component 204.1 to the associated optical coarse-delay paths. It thus comprises a delay output port 204.3 having delay outputs for coupling light pulses into the optical coarse-delay components for effecting the respective coarse delay amounts. The delay-calibration device 204.8 is configured to generate a further calibration delay of a tuneable calibration delay amount indicated by a calibration-control signal which it receives. The range of calibration delay amounts is small compared to the range covered by the fine delay. The calibration delay amount is controlled individually for each delay output by the calibration control signal, which is received via a calibration control input 204.9. The calibration control signal may comprise a corresponding number of control signal components, each for controlling the delay calibration for each delay output.

Figure 3:
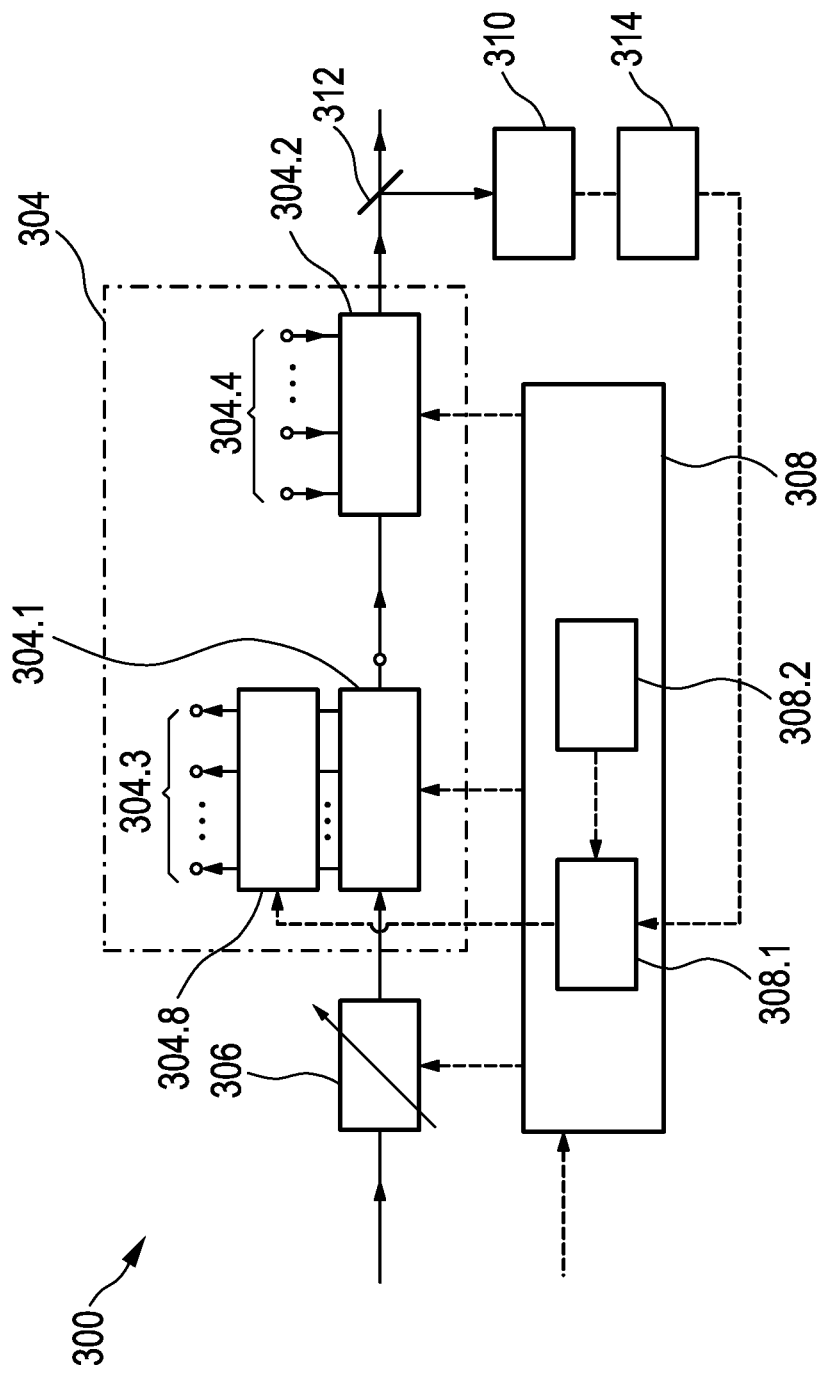
FIG. 3 shows another embodiment of an EPIPD-control component.

The optical switching component can also be used in an EPIPD-control component shown in FIG. 3. FIG. 3 is a block diagram of another embodiment of an electronic-photonic integrated precision delay (EPIPD)-control component 300 which largely corresponds to the embodiment of FIG. 1. As a general note related to the following description, unless otherwise stated, reference numerals will be used for components that have a functional correspondence to those of the embodiments of FIG. 1 or 2, except for using a different leading digit such as "3", "4" etc. instead of "1" or "2". The following description concentrates on differences of the embodiment of FIG. 3 in comparison with those of FIGS. 1 and 2. As far as any structural element labelled in FIG. 3 is not addressed in the following description, reference is made to the description of FIGS. 1 and 2 for the description of the corresponding structural element.

The EPIPD-control component 300 comprises a delay-monitoring detector 310 that receives a fraction of the optical signal behind the second optical switching component 304.2 of the coarse-delay switching unit 304. The delay-monitoring detector 310 generates an electrical delay-monitoring signal that represents a temporal intensity trace of a pulse train in the detected optical signal, for determining the timing of the individual pulses. It may operate as an envelope detector. A fast integrated photodetector such as a photodiode can be used as the delay-monitoring detector 310. The fraction of the optical signal that is required for generating the delay-monitoring signal is branched off from the main optical path by a beam splitter 312. In case available photodetectors are not fast enough or do not provide a sufficient amount of output current, toggle flip flops can be used to generate an electrical signal with a duty cycle that reflects the temporal characteristic of the electrical signal trace generated by the photodetector, in order to allow precisely determining the timing of the detected individual light pulses.

A spectrum-analysis unit 314 receives the delay-monitoring signal from the delay-monitoring detector 310 and determines frequency components governing the temporal dependence of the electrical delay-monitoring signal. In particular, the spectrum-analysis unit may be configured to perform a Fast-Fourier-Transform (FFT) analysis of the delay-monitoring signal. It thus generates and provides frequency-analysis information indicative of the frequency components of the delay-monitoring signal and provides this information to a feedback driver 308.1 that a part of the controller circuit 308. The feedback diver 308.1 uses this information to provide to the delay-calibration device 304.8 with calibration control signals indicative of an increase or decrease of the individual calibration delays to be effected, depending on the frequency-analysis information. A feedback controller 308.2 is configured to control the feedback driver 308.1 in generating the calibration control signals to maintain a desired temporal dependence of the delay-monitoring signal, and thus of the optical output signal, as a pulse train that is governed by a single pulse repetition frequency. This way, a particularly high accuracy and stability of the frequency of the output signal can be achieved even at very high frequencies, which is advantageous for applications in high-frequency sampling etc. This is useful in particular in pulse-interleaving applications, such as in an up-converter.

The controllable delay-calibration device 304.8 can be provided in different alternative positions within the EPIPD-control component 300. While FIGS. 2 and 3 show it as a part of the first switching component 204.1, it is possible as an alternative to use it on the input side of the second switching component 304.2.

As for hardware implementations of the delay-calibration device 304.8, similar options and considerations apply as for the fine delay unit 106 described in the context of FIG. 1. The required range of available delays should roughly correspond to that of the fine delay unit 106, in order to compensate for tolerances due to fabrication of the particular hardware design. Such tolerances on chip are typically between 1 and 5% and are clearly below 1 ps, whereas coarse delay lines implemented by fiber may have tolerances of a few 10 ps. Since any delay calibration device contributes to optical losses, it is preferred to use implementations with particularly low-loss materials. Here for instance waveguide-materials with lower losses than silicon may be used. Silicon nitride is a suitable alternative waveguide material.

Figure 4:
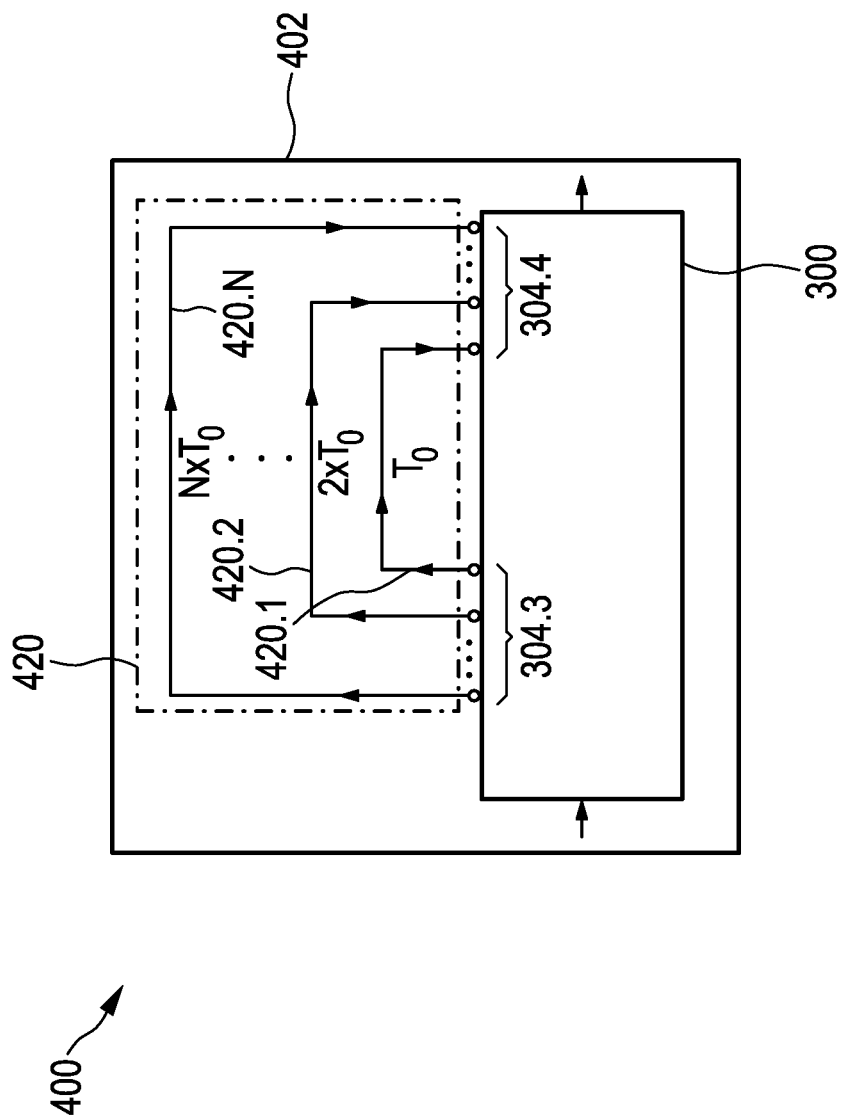
FIG. 4 shows an embodiment of an optical precision delay component including an EPIPD-control component.

FIG. 4 shows an embodiment of an optical precision delay component 400 including the EPIPD-component 300 of FIG. 3. The optical precision delay component 400 comprises an electro-optical circuit board 402, which integrates electrical and optical infrastructure for accommodating integrated electronic circuitry and optical or electronic-photonic integrated circuitry. In particular, an EPIPD-control component, in the present embodiment the EPIPD-control component 300, which is electrically and optically connected on the electro-optical circuit board 402. Further electronic or photonic circuits or components may be arranged on the electro-optical circuit board 402 and connected to the EPIPD-control component 300, such as a mode-locked laser that generates a laser pulse train provided as an optical input signal to the EPIPD-control component 300. However, such additional components are not shown in FIG. 4 for simplicity. Also not shown are optical waveguides and electrical connection traces provided on the electro-optical circuit board 402 to connect the EPIPD-control component 300 to such other components for establishing an optical or electrical signal flow.

The EPIPD-control component 300 is connected to a photonic delay module 420 that is connected to the coarse-delay switching unit and comprises a number N of optical delay lines 420.1, 420.2, . . . , 404.N, which are arranged and connected to receive the optical input signal from the delay output port 304.3 of coarse-delay switching unit (which is not shown here in any further detail) and provide the optical input signal with a respective delay to respective delay inputs of the delay input port 304.4 connected with the second switching unit (not shown her). Each of the optical delay lines is configured to subject the optical input signal to one of the plurality of discrete coarse group-delay amounts. In the present examples, the different optical delay lines induce a desired coarse group delay amount for any given incoming light pulse that is an integer multiple of a smallest coarse group delay amount $T_0$ achieved by the first optical delay line 420.1. By controllably splitting an incoming light pulse into two or more pulses within the first switching component of the coarse delay switching unit, two or more different coarse delay amounts can be applied to the same pulse. As will be shown further below, proper design of the coarse-delay switching can achieve the further option of applying two or more different coarse delay amounts in series to the same incoming pulse, thus achieving an even wider dynamic range of available delay amounts. The number N of optical delay lines is chosen with regard to a particular application case, and may for the sake of example be 4, 8, or 10, or any other suitable number.

Thus, by the joint action of the EPIPD-control component 300 in switching the coarse delay and adjusting the fine delay and of the photonic delay module 420 in effecting the desired coarse delay amounts, a precision control of the group delay of individual pulses of a light pulse train is achieved. This enables improvements in the operation of a number of application devices, in particular at very high frequencies in the 100 GHz or GS/s regime. Such application devices that can benefit from the precision delay component 400 include a pulse interleaver for the generation of a high frequency laser pulse train from a periodic picosecond laser signal, or a high-precision clock signal generator with high signal quality that can for instance be used in the sampling of analog signals in high-frequency measurement applications. Purely electronic systems reach their limits when faced with such high frequency and signal quality requirements.

Figure 5:
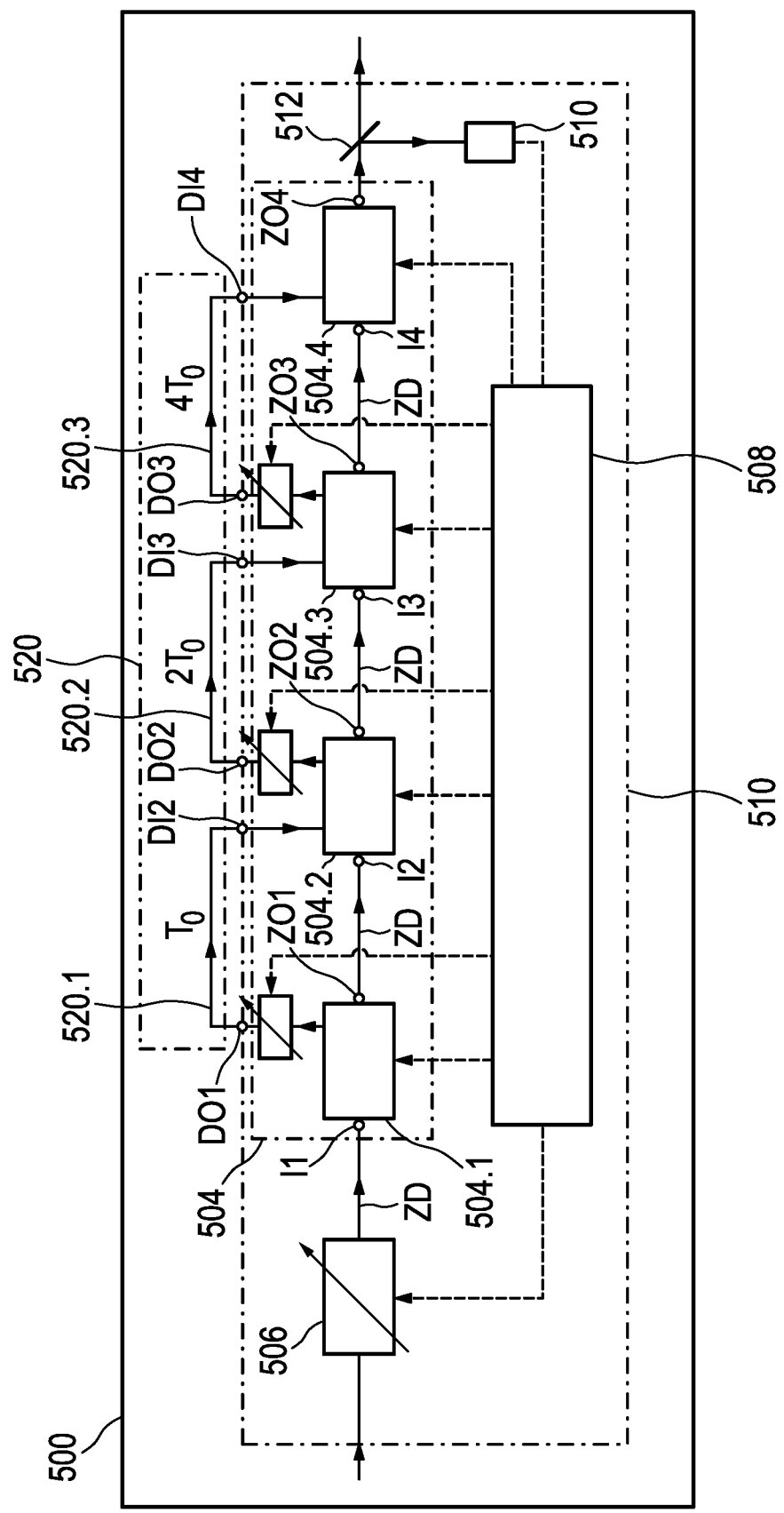
FIG. 5 shows another embodiment of optical precision delay component with a further embodiment of an EPIPD-control component.

FIG. 5 shows another embodiment of an optical precision delay component 500. The optical precision delay component 500 differs from the previously described embodiments in the structure of its EPIPD-control component 510 and of its photonic delay module 520, as will be described in the following.

Turning to the EPIPD-control component 510, the coarse-delay switching unit 504 comprises a series connection of four optical switches 504.1 to 504.4, which are inserted between a series of zero-delay sections ZD of a zero-delay path in the EPIPD-control component 510 that is associated with the group-delay amount of zero. The optical switches 504.1 to 504.4 have a respective first switch input port I1 to I4 for receiving the optical input signal from the respective zero-delay path section ZD as a first optical switch input signal. The optical switches 504.2, 504.3 and 504.4, i.e. the optical switches other than the first optical switch 504.1 along the zero-delay path sections ZD, additionally have a respective second switch input port DI2 to DI4 for additionally receiving a respective delayed optical input signal from an optical coarse-delay path 520.1 to 520.3 associated with a respective next-preceding one of the optical switches in the series connection as a second optical switch input signal. A respective zero-delay output port ZO1 to ZO4 serves for feeding the first optical switch input signal and/or the received delayed second optical switch input signal to the next-succeeding zero-delay section ZD. Furthermore, a respective discrete-delay output port DO1 to DO4 feeds the first optical switch input signal and/or the second optical switch input signal forward to an associated one of the coarse-delay paths.

These optical switches 504.2, 504.3 and 504.4 are configured to subject the second optical switch input signal to switching action to be performed by the respective optical switch independently from the switching action to be performed for the first switch input signal. In particular, the optical switches 504.2, 504.3 and 504.4 are configured to be individually switched to one of a first switching state to only feed the respective first or second optical switch input signal forward to a next zero-delay section, a second switching state to only feed the respective first or second optical switch input signal forward to a respective one of the optical coarse-delay paths that branches off from the zero-delay path to subject the respective first or second optical switch input signal to an associated one of the discrete coarse group-delay amounts, a third switching state to feed the respective first or second optical switch input signal forward to the zero-delay path and to the respective one of the optical coarse-delay paths in parallel, and a fourth switching state, to feed the first and second optical switch input signal forward to the zero-delay path and to the respective one of the optical coarse-delay paths in parallel.

The case of the fourth switching state, all switches closed, is in particular useful for pulse-interleaving applications. Where this application is the only intended use case of the device, it can alternatively by implemented by omitting the switches and using couplers. In some embodiments, therefore, the fourth switching state may not be provided for selection.

The coarse-delay switching signal provided by the controller circuit 508 is indicative of the respective selected switching state of the respective optical switches to be applied to the first or second optical switch input signal. Further details of the switching will be explained further below with reference to an exemplary implementation of an optical switch that can be used as any of the optical switches shown in FIG. 5. The discrete coarse group-delay amounts $T_{D,n}$, with n=0, 1, 2, . . . , N (in the present case N=3) of the delay lines of photonic delay module 520 form a binary sequence of increasing multiples of an elementary coarse group-delay amount $T_0$. In the general case, such a binary sequence is governed by $T_{D,0}=0$ for n=0, and $T_{D,n}=2^n \times T_0$, n=, 1, 2, 3, . . . , N up to a maximum multiple $2^N \times T_0$. Specifically, in the present exemplary case, the zero-delay path does not introduce any additional delay, the delay line 520.1 provides a delay of $T_0$, the delay line 520.2 provides a delay of $2T_0$, and the delay line 520.3 provides a delay of $4T_0$. For the purpose of an instructive example, $T_0$ may be 100 ps. In other embodiments, the sequence of increasing multiples is a linear sequence. As an example, an n-th delay line may provide a group delay of $n \times T_0$, n=, 1, 2, 3, ..., N.

With regard to delay fine tuning and delay calibration capabilities, the optical precision delay component 500 is equipped with the controllable fine-delay unit 506 previously described and with the feedback and control loop via the delay-monitoring detector 510 and subsequent spectrum-analysis unit and feedback driver, which in the present embodiment are not shown separately because they are integrated into the controller circuit 508. Reference is made to the more detailed description in the context of FIG. 3. Thus, the fine tuning unit and each of the optical switches 504.2, 504.3 and 504.4 of the coarse switching unit are subject to individual control and calibration Thus, a large variety of pulse train modifications of an incoming pulse train can be achieved. The modified output pulse train can be generated with particularly high frequency and high timing precision that may for instance be governed by a single repetition frequency.

Figure 6:
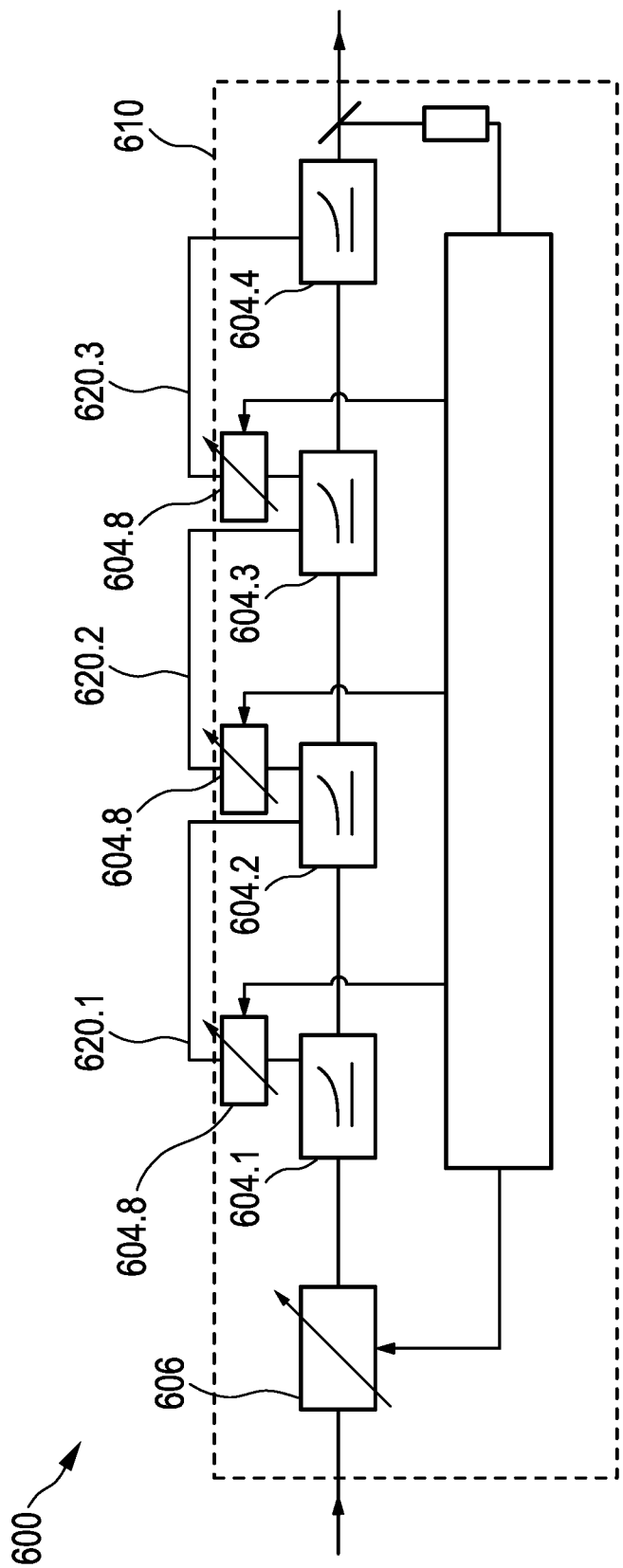
FIG. 6 shows, based on the structure of the embodiment of FIG. 5, an application implementation of an optical precision delay component as a pulse interleaver.

The following description turns to an application example of the optical precision delay component 500. FIG. 6 shows an embodiment of a pulse interleaver 600 based on the general structure of optical precision delay component 500 of FIG. 5. However, the pulse interleaver 600 differs from the optical precision delay component 500 in that the individual optical switches 604.1 to 604.4 are implemented in a simpler form as 1×2 optical couplers. The incoming optical signal is thus split into a first fraction fed forward to the zero-delay path ZD, and a second part that is directed to the delay output of the respective optical switch for coupling it into a respective connected delay line of the delay module, i.e. delay line 620.1, 620.2, or 620.3, via the respective delay-calibration device 604.8. The delay lines may implement a binary-weighted sequence of coarse group-delay amounts $T_{D,n}=2^n \times T_0$, n=, 1, 2, 3, ..., N, as described in the context the embodiment of FIG. 5. The number of delay lines and individual group-delay amounts in the delay module of the pulse interleaver depends on the desired increase of the pulse repetition frequency, or a desired number of phases, as in ADC interleaving. The number is three in the present embodiment for the purpose of giving an example.

As can be seen from FIG. 6, this embodiment of the invention allows implementing a particularly simple electrical control because of a pre-defined pulse interleaving function that does not require time-variant electrical switching control of the individual optical switches 604.1 to 604.4 in the coarse-delay switching unit. Precise timing control is still achieved by controlling the fine-delay unit 606 and the delay-calibration devices 604.8. With the pulse interleaver 600, therefore, a precisely timed high-frequency pulse train of output laser pulses can be generated from an incoming lower-frequency laser pulse train. The incoming laser pulse train may for instance be generated by a mode-locked laser (not shown). The mode-locked laser may be arranged on the same electro-optical circuit board as the EPIPD-control component 610 and the delay module with its delay lines 620.1, 620.2, and 620.3.

Figure 7:
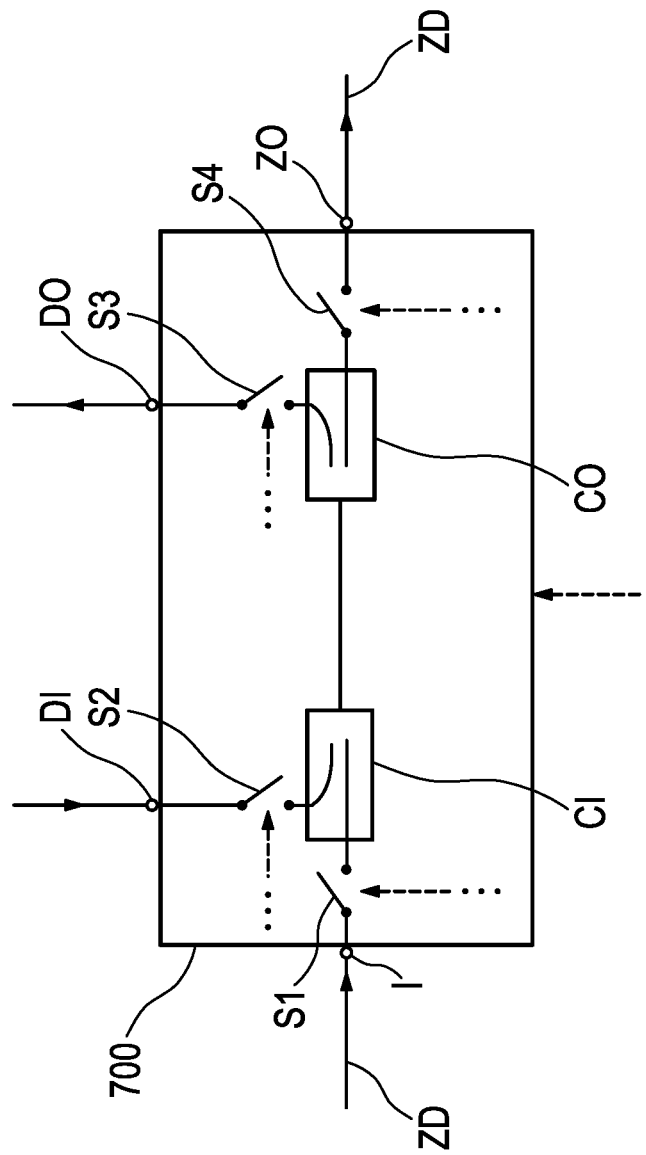
FIG. 7 is an exemplary implementation of an optical switch suitable for use in the optical precision delay component of FIG. 5.

While the pulse interleaver of FIG. 6 has a particularly simple structure of an optical switch in the coarse-delay switching unit, the exemplary implementation of an optical switch 700 described in the following with reference to FIG. 7 is suitable for use in the optical precision delay component of FIG. 5 and also in the pulse interleaver of FIG. 6.

The optical switch 700 has a first switch input port I for receiving the optical the optical input signal from the respective zero-delay path section ZD as a first optical switch input signal. A second switch input port DI is for receiving a delayed optical input signal from a connected optical coarse-delay path (not shown) associated with a respective next-preceding one of the optical switches in a series connection as a second optical switch input signal. Furthermore, a zero-delay output port ZO provides the first optical switch input signal to the next-succeeding zero-delay section ZD. A discrete-delay output port DO feeds the first optical switch input signal forward to an associated one of the coarse-delay paths.

The optical signal flow within the optical switch 700 is controlled by four controllable optical switching elements S1 to S4 and an optical input coupler CI and an optical output coupler CO, as described in the following. The optical input coupler C is a 2×1 coupler that receives the first optical switch input signal and/or the second optical switch input signal, depending on the switching states of the switching elements S1 and S2. The switching element S1 allows or blocks the optical signal flow between the first switch input port I and the optical coupler C, and the switching element S2 allows or blocks the signal flow between the second switch input port DI and the optical coupler C. The optical output coupler CO is a 1×2 coupler that receives the first optical switch input signal and/or the second optical switch input signal from the optical input coupler CI, depending on the switching states of the switching elements S1 and S2. The switching element S3 allows or blocks the optical signal flow between the optical output coupler CO and the discrete delay output port DO, whereas the switching element S4 controls allows or blocks the optical signal flow between the optical coupler CO and the zero-delay output port ZO. Thus, the first to fourth switching states described in the context of FIG. 5 can be implemented as follows:

First Switching State:
S1 or S2 is closed, S3 is open, S4 is closed. This switching state feeds the respective first and/or second optical switch input signal forward to only the next zero-delay section ZD. In order to feed forward both the first and the second optical switch input signals, S1 and S2 are closed.

Second Switching State:
S1 or S2 is closed, S3 is closed, S4 is open. This switching state feeds the respective first or second optical switch input signal forward to the connected optical coarse-delay path via the discrete delay output DO.

Third Switching State:
S1 or S2 is closed, S3 is closed, S4 is closed. This switching state feeds the respective first and/or second optical switch input signal forward to the zero-delay path ZD and to the discrete delay output port DO.

Fourth Switching State:
S1 to S4 are closed. This switching state feeds the first and second optical switch input signal forward to the zero-delay path ZD and to the discrete delay output port DO.

Other embodiments of the optical switch have a reduced number of switching elements, which may be provided or omitted depending on the desired optical output. As was shown above for the embodiment of FIG. 6, it is even possible to reduce the number of switching in the optical switch elements to zero, or, in case switching elements are provided, to provide an initial switching-element setting and refrain from controlling operation of the switching elements during operation.

Figure 8:
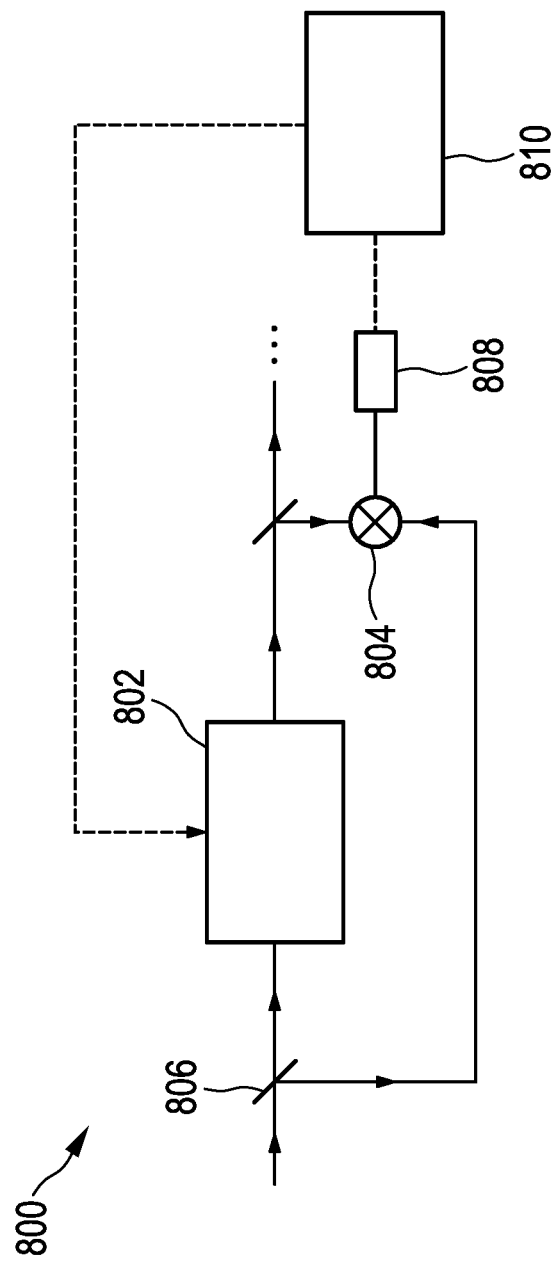
FIG. 8 is a schematic illustration of a phase stabilization loop that can be used in different positions of an EPIPD-control component or of a precision delay component.

FIG. 8 is a schematic diagram illustrating a phase stabilization loop that can be used in different positions of an EPIPD-control component or of a precision delay component.

The phase-stabilization loop achieves and maintains a stable phase in the output of a fine-delay unit 802 in an EPIPD-control component. The phase-stabilization loop can alternatively or additionally be provided in association with other optical components along the optical signal propagation path in a precision delay component. For example, a phase-stabilization loop may behind any of the coarse-delay paths or at the final output of the precision delay component.

Continuing the example of a phase-stabilization for the fine-delay unit 802, a phase discriminator 804 is arranged and configured to receive a fraction of a fine-delay-output signal at an output of the fine-delay unit and of an optical reference signal corresponding to the optical input signal. As shown, the reference signal is obtained by branching off a fraction of the optical input signal using a beam splitter 806. The phase-discriminator output signal, which may for instance be generated using a superposition and thus interference of the optical reference signal with the fine-delay-output signal, is indicative of a phase difference between the respective fine-delay output signal and the reference signal. The phase-discriminator output signal can be generated in electronic form using a photodiode 808, again as an envelope detector. A phase-control unit 810 receives the phase-discriminator output signal and stores an initial signal indicated of an initial phase difference between the respective fine-delay output signal and the reference signal. In the course of operation, the phase-control unit 810 monitors the phase-discriminator output signal to detect the amplitude indicative of a phase difference between the reference signal and the fine-delay output signal. In response to detection of an amplitude change, the phase-control unit 810 adapts a phase actuator drive signal to drive a phase actuator of the fine-delay unit 802 (not shown) to modify the dispersion characteristics of the fine-delay unit 802 so as to maintain the initial or, more generally speaking, a desired phase difference between the respective fine-delay output signal and the reference signal.

This way, the phase coherence and the absolute phase can be stabilized against in the presence of low-frequency jitter, which is advantageous in MIMO systems.

As mentioned, additional phase-stabilization loops can be used to stabilize the phase at the output of the delay-calibration devices. Other embodiments have only phase-stabilization loops that stabilize the phase at the output of the delay-calibration devices. The provision and placement of phase-stabilization loops can thus be determined in the design phase of the precision delay component in accordance with the requirements of a particular application case and based on the characteristics of the hardware components to be used.

In summary, an electronic-photonic integrated precision delay-control component comprises a coarse-delay switching unit that is configured to assume one of a plurality of selectable switching states and to feed, in a given one of the switching states, an optical input signal forward to at least one of a plurality of selectable optical coarse-delay paths. A controllable fine-delay unit is configured to subject the optical input signal to a selectable fine group-delay amount that is tuneable between zero and a maximum fine group-delay amount which suitably amounts to a smallest of the coarse group-delay amounts. The coarse-delay switching unit and the fine-delay unit are arranged in a series connection to control application of a respective total group-delay amount to the optical input signal on any selectable total delay path including the coarse-delay switching unit and the fine-delay unit, the respective total group-delay amount corresponding to a sum of the respective coarse group-delay amount and of the selectable fine group-delay amount. Co-integration of electronic components allows a complete pulse train generation on one chip with low sensitivity to perturbation, low drift and low manufacturing costs. A desired delay of individual pulses of the optical input signal can be tuned on chip with particularly high precision at particularly high pulse repetition frequencies, for instance in the range of 10 or 100 GHz.

What is claimed is:

1. An electronic-photonic integrated precision delay-control component, comprising:
    an optical input interface for receiving and internally forwarding a pulsed optical input signal;
    a coarse-delay switching unit that is configured to assume one of a plurality of selectable switching states and to feed, in a given one of the switching states, the pulsed optical input signal forward to at least one of a plurality of selectable optical coarse-delay paths to subject the pulsed optical input signal to one or more respective coarse group-delay amounts from a plurality of discrete coarse group-delay amounts that includes a group-delay amount of zero, wherein the coarse-delay switching unit receives an electronic coarse-delay switching signal indicative of the one or more respective coarse group-delay amounts to be selected in the given switching state;
    a controllable optical fine-delay unit that is configured to subject the pulsed optical input signal to a selectable fine group-delay amount that is tuneable between zero and a maximum fine group-delay amount which suitably amounts to a smallest of the coarse group-delay amounts, wherein the optical fine-delay unit receives an electronic fine-delay-selection signal, which is indicative of a selected fine group-delay amount to be tuned to; and wherein
    the coarse-delay switching unit and the optical fine-delay unit are arranged in a series connection to control application of a respective total group-delay amount to the pulsed optical input signal on any selectable total delay path including the coarse-delay switching unit and the optical fine-delay unit, the respective total group-delay amount corresponding to a sum of the respective coarse group-delay amount and of the selectable fine group-delay amount that are selectable via the coarse-delay switching signal and the fine-delay-selection signal, respectively.

2. The electronic-photonic integrated precision delay-control component of claim 1, wherein the coarse-delay switching unit comprises a plurality of electronically controllable optical switches for controllably feeding the pulsed optical input signal forward to the at least one selectable optical coarse-delay path, to thus subject the pulsed optical input signal to the one or more respective discrete coarse group-delay amounts, wherein the coarse-delay switching signal is indicative of the switching states of the individual optical switches to be selected.

3. The electronic-photonic integrated precision delay-control component of claim 2, wherein the coarse-delay switching unit comprises a series connection of two or more of the optical switches, which are inserted between a series of zero-delay sections of a zero-delay path that is associated with the group-delay amount of zero, and which have a first switch input port for receiving the optical input signal from the zero-delay path as a first switch input signal, a zero-delay output port for feeding the first switch input signal to the next-succeeding zero-delay section, and a discrete-delay output port for feeding the first switch input signal forward to an associated one of the coarse-delay paths; and wherein those optical switches other than a first optical switch along the zero-delay path additionally have a second switch input port for additionally receiving a respective delayed optical input signal from an optical coarse-delay path associated with a respective next-preceding one of the optical switches in the series connection as a second switch input signal, and are configured to subject the second switch input signal to switching action to be performed by the respective optical switch independently from the switching action to be performed for the first switch input signal.

4. The electronic-photonic integrated precision delay-control component of claim 3, wherein the optical switches are configured to be individually switched to one of:

a first switching state to only feed the respective first or second switch input signal forward to a next zero-delay section;

a second switching state to only feed the respective first or second switch input signal forward to a respective one of the optical coarse-delay paths that branches off from the zero-delay path to subject the respective first or second switch input signal to an associated one of the discrete coarse group-delay amounts; and a third switching state to feed the respective first or second switch input signal forward to the zero-delay path and to the respective one of the optical coarse-delay paths in parallel; and a fourth switching state, to feed the first and second optical switch input signal forward to the zero-delay path and to the respective one of the optical coarse-delay paths in parallel; and wherein the coarse-delay switching signal is indicative of the respective selected switching state of the respective optical switches to be applied to the first or second switch input signal.

5. The electronic-photonic integrated precision delay-control component of claim 2, wherein the coarse-delay switching unit further comprises a controllable delay-calibration device which is arranged between at least one of the optical switches and an associated optical coarse-delay path, receives a calibration-control signal indicative of the tuneable calibration-delay amount, and is configured to generate a calibration delay of the tuneable calibration delay amount indicated by the calibration-control signal.

6. The electronic-photonic integrated precision delay-control component of claim 5, further comprising a calibration control loop with:

a delay-monitoring detector that is arranged and configured to receive a fraction of the optical input signal between the optical switch and its associated optical coarse-delay path or a fraction of an optical output signal behind a last of the optical switches and to generate an electrical delay-monitoring signal representing a temporal intensity trace of a pulse train in the detected optical input signal;

a spectrum-analysis unit that receives the electrical delay-monitoring signal that and is configured to determine frequency components governing the temporal dependence of the electrical delay-monitoring signal and to provide frequency-analysis information indicative thereof;

a feedback driver that is configured to generate and provide to the delay-calibration device respective calibration control signals indicative of an increase or decrease of the calibration delay to be effected; and a feedback controller that is configured to control the feedback driver in generating the calibration control signals to maintain a desired temporal dependence of the optical output signal as a pulse train that is governed by a single pulse repetition frequency.

7. The electronic-photonic integrated precision delay-control component of claim 1, wherein the controllable optical fine-delay unit comprises:

an optical conductor that conducts the incoming optical input signal with a group-delay amount that depends on a current value of a delay-control quantity associated with the optical conductor; and a controllable delay actuator that receives the fine-delay-selection signal and is arranged and configured to set the delay-control quantity in dependence on fine-delay-selection signal.

8. The electronic-photonic integrated precision delay-control component of claim 7, further comprising a phase-stabilization loop comprising:

a phase discriminator arranged and configured to receive a tapped fraction of a signal tapped anywhere along an internal signal propagation path and an optical reference signal corresponding to the optical input signal, and to provide a phase-discriminator output signal indicative of a phase difference between the tapped signal and the reference signal; and a phase-control unit that receives the phase-discriminator output signal and is configured to store an initial phase difference between the tapped signal and the optical reference signal and to adapt the fine-delay-selection signal over time to maintain the initial phase difference between the respective tapped signal and the reference signal.

9. The electronic-photonic integrated precision delay-control component of claim 7, wherein:

the optical conductor is made of a conductor material that subjects an incoming optical signal to a fine group-delay amount that depends on a temperature of the conductor material; and the fine-delay unit comprises a controllable heating element configured to set the temperature of the conductor material in dependence on the fine-delay selection signal.

10. An optical precision delay component, comprising:

an electronic-photonic integrated precision delay-control component according to claim 1; and a photonic delay module that is connected to the coarse-delay switching unit and comprises a plurality of optical delay lines arranged to receive the optical input signal from the coarse-delay switching unit, wherein each of the optical delay lines is configured to subject the pulsed optical input signal to one of the plurality of discrete coarse group-delay amounts.

11. The optical precision delay component of claim 10, wherein the photonic delay module comprises an optical or electro-optical printed circuit board, and wherein the optical delay lines are respective monolithical waveguides on the optical or electro-optical printed circuit board.

12. The optical precision delay component of claim 10, wherein the optical delay lines are respective optical fibers connected to the coarse-delay switching unit.

13. The optical precision delay component of claim 10, wherein discrete coarse group-delay amounts $T_{D,n}$, n=0, 1, 2, 3, ..., N, form a set of increasing multiples of an elementary coarse group-delay amount $T_0$,
   in accordance with a linear sequence governed by $T_{D,n}=n \times T_0$, up to a maximum multiple $N \times T_0$, or
   in accordance with a binary sequence governed by $T_{D,0}=0$ for n=0 and $T_{D,n}=2^n \times T_0$, n=, 1, 2, 3, ..., N up to a maximum multiple $2^N \times T_0$.

14. The optical precision delay component of claim 10, further comprising an electronic switching-control circuit which is configured to receive a delay control input indicative of a total group-delay amount the pulsed optical input signal is to be subjected to, and to generate and provide the coarse-delay switching signal and the fine-delay-selection signal using the delay control input.

15. A laser arrangement, comprising:
   a mode-locked laser source configured to generate and provide a periodic pulse-shaped optical input signal having a basic pulse period; and
   a pulse interleaver comprising an optical precision delay component according to claim 10, arranged to receive the pulse-shaped optical input signal and configured to subject the pulsed optical input signal to a plurality of equidistant total group-delay amounts to provide an optical output signal having an output pulse period forming an integer multiple of the basic pulse period.

* * * * *